United States Patent Office 3,694,350
Patented Sept. 26, 1972

3,694,350
HYDRODESULFURIZATION WITH A HYDROGEN TRANSFER CATALYST AND AN ALKALINE COMPOSITION
Arnold N. Wennerberg, Chicago, Ill., assignor to Standard Oil Company, Chicago, Ill.
No Drawing. Continuation-in-part of application Ser. No. 752,782, Aug. 15, 1968. This application Mar. 18, 1971, Ser. No. 125,797
Int. Cl. C10g 23/02, 23/04, 23/12
U.S. Cl. 208—212           17 Claims

ABSTRACT OF THE DISCLOSURE

A process for hydrodesulfurizing hydrocarbons with hydrogen, a hydrogen transfer catalyst and an alkaline composition. The $H_2S$ formed in the reaction is removed by reacting it within the reaction zone with the alkaline composition to form a solid alkaline sulfide product. The alkaline composition may be an oxide, hydroxide, sulfide or carbonate of an alkali metal or an alkaline earth metal. Essentially complete desulfurization of heavy asphaltic hydrocarbons is achieved by this process wherein the resulting oil product consists of highly aromatic components of generally lower molecular weight.

CROSS-REFERENCE TO RELATED APPLICATIONS

This application is a continuation-in-part of copending application Ser. No. 752,782, filed Aug. 15, 1968, now abandoned.

BACKGROUND OF THE INVENTION

The removal of sulfur from petroleum has long been of importance to refiners. In the United States alone, nearly 12 million dollars a year are spent for research and development in fuel desulfurization. Much of the crude oil produced today contains various amounts of sulfur. As current crude oil fields are exhaused, the outlook for future production indicates that the sulfur content of crude oil will, on the average, increase. This sulfur is present in petroleum in a wide variety of forms. These include mercaptans, sulfides, disulfides, as well as sulfur present in complex ring compounds such as thiophenes. For many reasons it is important to remove or at least reduce the sulfur from petroleum. For example, the presence of sulfur in gasoline requires the addition of substantially increased quantities of tetraethyl lead or other antiknock compounds in order to achieve satisfactory octane levels. Generally, motor fuels containing sulfur have disagreeable odors and tend to have undesirable gum-forming characteristics. It is generally accepted that air pollution is becoming an increasingly serious problem and ways must be found to control the release of contaminants to the atmosphere. The burning of fuel oil containing sulfur is said to be a major factor contributing to the air pollution problem. When the oil is burned, the combined sulfur is oxidized and forms sulfur dioxide, which is released to the atmosphere.

Many desulfurization processes are currently available. Removing sulfur from lower-boiling petroleum fractions is not difficult, but as the boiling point of the petroleum fraction increases, the difficulty of desulfurization correspondingly increases. Similarly, it is easier to desulfurize a paraffinic molecule than a naphthenic molecule, and even more difficult to desulfurize an aromatic molecule. Consequently, although many techniques are now available for removing sulfur from light products, including molecular sieves, clay or charcoal adsorption, extraction, acid-treating and light hydrogen treatment at low pressures, the choice is more limited when dealing with heavier products.

It is well-known that hydrogen processes are particularly useful in upgrading petroleum stocks and other carbonaceous materials. Among the many reactions that can occur when a feed stock is hydro-treated are denitrogenation, deoxygenation, dehydrogenation and desulfurization. Each of these reactions is a type in which a "foreign" element is removed from the organic material. Although these hydrorefining methods are well known, until recently it has been felt that because of the high cost of hydrogen and because of the availability of alternative purifying processes, hydrorefining was not economical. However, as hydroforming units have become more widespread, resulting in an increased supply of hydrogen, the incentive to develop a commercial hydrodesulfurization process has been revived.

Although conventional hydrosulfurization processes have been satisfactory for relatively light stocks, they have not proved to be adequate for desulfurizing the heavier materials, particularly those containing asphaltenes. My process relates to a method for desulfurizing any normally non-gaseous hydrocarbon and is particularly useful for desulfurizing the heavier crude oils and re-residuums. In addition to merely removing sulfur contained in the feed, my process also upgrades the feed stock by cracking the molecules into more desirable components.

In short, my process combines the advantages of desulfurization with those of cracking of large, high molecular weight hydrocarbon molecules into more valuable lower molecular weight substituents. The "oil" product of my invention is highly aromatic and contains molecules having between about 35 and 50 carbon atoms. Other methods of cracking residual stocks usually result in rapid coking of the catalyst and the deposition of thick sludge within the processing equipment. In my process, the catalyst is not deactivated by coking nor is sludge formed to foul the process equipment.

SUMMARY OF THE INVENTION

My invention relates to the desulfurization and upgrading of petroleum stocks having combined sulfur present. It is particularly useful in the processing of heavy crude oils and residual stocks. Generally speaking, my invention involves the activation of the carbon-sulfur bond, the breaking of the bond in the presence of hydrogen gas to form $H_2S$, and the immediate removal of the $H_2S$ thus formed from the reaction zone in order to avoid the recombination of the sulfur with the cracked products. Thus, the removal of the $H_2S$ prevents the sulfur from recombining with the cracked products to form new condensation products which are undesirable. It minimizes the possible transfer of sulfur from one combined form to another.

Many ways of removing $H_2S$ from the reaction zone are possible. One way would be to provide a high gas flow through the reaction zone which would sweep the $H_2S$ out. The $H_2S$ and gas could then be separated and the gas recycled back into the reaction zone. Since the reaction requires the presence of hydrogen, hydrogen would be an effective sweep gas. I have found that there is another highly efficient means of removing the sulfur from the reaction zone. Since the sulfur is present in the form of $H_2S$, it could be tied up by reacting the $H_2S$ with another reagent. Once the $H_2S$ combines with the reactant to tie up the sulfur in a solid phase, the solid phase can then be physically removed from the reaction zone. It would be advantageous if the sulfur could be removed from the solid phase and the reactant regenerated and added back to the reaction zone. Ideally, this reaction material would also aid in springing the sulfur from the hydrocarbon by activating the carbon-sulfur bond, thereby promoting the reaction of the sulfur with available hydrogen gas to form $H_2S$.

I have discovered that strong alkaline reagents are reactants which provide the above desirable results. In particular, the oxides, hydroxides and sulfides of the alkali metals and alkaline earth metals are well suited for these purposes. In addition, certain naturally occurring alkaline materials such as dolomite (magnesium oxide and magnesium carbonate) can be used in my invention. Specifically, I have found that calcium oxide works well as the alkaline reactant of my invention.

The process of my invention comprises contacting a sulfur-containing hydrocarbon material, preferably a heavy petroleum stock or crude oil, with hydrogen in the presence of a hydrogen transfer catalyst and an alkaline reactant, at a sufficient temperature and sufficient $H_2$ partial pressure to cause alkaline activation and possibly hydrogenolysis of at least some of the carbon-sulfur bonds to form $H_2S$ gas. The $H_2S$ is then immediately removed from the system, either physically in the gaseous state, or by having the $H_2S$ combined with the alkaline reactant to form a solid phase metal sulfide (or polysulfide), thereby "tieing up" the sulfur. The preferred means of removing the $H_2S$ is to provide sufficient alkaline reactant to convert a major portion of the $H_2S$ formed to a solid phase metal sulfide (or polysulfide) with the balance of the $H_2S$ being swept out in the gaseous state, To minimize $H_2S$ recombination reactions, enough alkaline reactant should be added to remove all of the $H_2S$ formed by conversion to metal sulfides. If the alkaline reactant were calcium oxide, the most predominant reaction would be:

$$CaO + H_2S \rightarrow \underline{CaS}\downarrow + H_2O$$

It is clear that during the tieing up reaction the alkaline reactant is constantly being depleted. Thus, it is necessary to always provide sufficient alkaline reactant to combine with all of the $H_2S$ produced in order to ensure that the concentration of $H_2S$ present is minimized to reduce recombination reactions with $H_2S$. Provisions for removing the metal sulfide or polysulfide produced in the reaction zone, for separating the solid phase sulfides and/or polysulfides from the hydrocarbon material, for externally regenerating the sulfides and/or polysulfides back to the original alkaline reactant, and for returning the alkaline reactant back to the reaction zone, should be made.

It is desirable to conduct the hydrogen contacting step in the presence of a hydrogen transfer catalyst. This, of course, facilitates the reaction by providing sites at which the hydrogen transfer occurs. A hydrogen transfer catalyst as used herein may be defined as a material which catalyzes a reaction involving the transfer of a hydrogen atom from a donor molecule to an acceptor molecule. Where the donor molecule is molecular hydrogen, the hydrogen transfer catalyst is termed a hydrogenation catalyst. Suitable hydrogen transfer catalysts include, as a metallic component, the elements, oxides, or sulfides of the transition metals. Typical metallic components are derived from the elements of Group II–B, VI–B, VII–B, or VIII of the Periodic Table of the Elements (Lange, N. A., Ed., Handbook of Chemistry, 10th Edition, pages 56–57, 1961). Particularly suitable metallic components may be derived from iron, cobalt, nickel, molybdenum, tungsten, chromium, palladium, platinum, zinc, and copper. The foregoing metallic compounds are generally combined with a carrier. Suitable carriers are well known in the art and may include any of a variety of inorganic materials which may be either synthetic or naturally occurring. Typical carriers include one or more of alumina, titania, vanadia, silica, thoria, zirconia, asbestos, kieselguhr, bauxite, and clay. Examples of metallic components on carriers include: $CoO \cdot MoO_3 \cdot Al_2O_3$, $$MoO_3 \cdot Al_2O_3, \quad WO_3 \cdot Al_2O_3$$

and $NiO \cdot MoO_3 \cdot Al_2O_3$. Methods for preparing the foregoing catalysts are well documented in the literature, the most common procedure including impregnating the inorganic carrier with the metallic component.

My process, however, may be used with a hydrogen-donating substance. The hydrogen-donating substance may be used, in addition to the hydrogen transfer catalyst. Suitable hydrogen-donating substances include hydroaromatic compounds having the ability to act as a donor of hydrogen atoms such as naphthenes, cyclic mono- and diolefins, hydronaphthalenes, hydroanthracenes, hydrophenanthrenes, and alkyl derivatives thereof. Particularly suitable compounds are Tetralin and Decalin.

Residuum-containing hydrocarbons such as heavy crude oils and residual stocks contain heavy asphaltic hydrocarbons and are much more complex than the high boiling gas oils. These asphaltic hydrocarbons contain an oil fraction soluble in propane, a resin fraction soluble in pentane, and an asphaltene fraction insoluble in pentane. Of the three fractions, the asphaltenes are the most complex, contain the greatest portion of heteroatoms and metals, and are the most refractory toward hydrodesulfurization. Normally, the resin fraction serves as a solvent for the asphaltenes. However, as hydrogenation and cracking progress, the resins are preferentially converted and the asphaltenes precipitate. The alkaline reactant of this invention helps to prevent this deleterious reduction in the resin/asphaltene ratio and reduces the number of condensation reactions which would form additional asphaltenes by effectively removing the $H_2S$ from the reaction. In processing asphaltenes or asphaltene containing heavy crude oils or residual stocks, it is further desirable to maintain the asphaltenes in a molecular state in order to facilitate the contacting step. This is accomplished by adding a suitable solvent which maintains the asphaltenes in a dissolved state. The above mentioned hydrogen donor compounds serve to function as such a solvent in addition to supplying hydrogen atoms. Tetralin and Decalin are particularly suitable because they are excellent solvents as well as excellent hydrogen donors.

The exact means by which the hydrogen-donating materials promote the desulfurization and hydrocracking reactions is not known. It is reasonable, however, that the material acts as a carrier of hydrogen, giving up its hydrogen to both the sulfur and the cracked hydrocarbons, and then catalytically regaining hydrogen from the hydrogen gas present in the reaction zone. Tetralin, for example, may be readily dehydrogenated to intermediate compounds such as 1,4-dihydronaphthalene and to naphthalene in the course of donating hydrogen to an acceptor component.

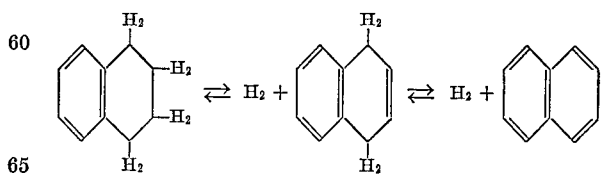

The above equilibrium distribution of naphthalene and hydronaphthalenes is dependent upon $H_2$ partial pressure with available catalystic means for hydrogen transfer. In addition, the hydronaphthalenes provide the means for effective solvolysis of highly condensed polynuclear aromatics as well as facilitate transfer of hydrogen to these relatively inaccessible polynuclear component.

DETAILED DESCRIPTION AND PREFERRED EMBODIMENT

In order to demonstrate the effect of the alkaline reactant on the hydrodesulfurization and cracking of a residual stock, the following two experiments were performed:

Experiment I

One hundred grams of a 70% residual stock were charged to an autoclave mounted in a rocker assembly. Four grams of a cobalt-molybdena-alumina

$(CoO \cdot MoO \cdot Al_2O_3)$ catalyst and 35 g. of a calcium oxide alkaline reactant were also added to the autoclave. The autoclave was then closed and the air was purged by sweeping with hydrogen gas. The system was pressurized with hydrogen to about 500 p.s.i.g. and heat was applied. The reactant was raised to about 800° F. and maintained at this temperature for 4 hours. During this time, the pressure varied from a maximum of about 1100–1300 p.s.i.g. at 800° F. to a final pressure of about 600 p.s.i.g. The pressure increased at first due to thermal expansion of the hydrogen and the production of $H_2S$. The reason for the decrease in pressure was mainly due to the consumption of hydrogen and $H_2S$. It was noted that $H_2S$ was present in the off-gas, indicating that there was insufficient calcium oxide present to tie up all of the $H_2S$ generated. Therefore, after sampling the composition of the reaction products in the autoclave, 10 additional grams of calcium oxide were added to the reaction mixture. The autoclave was then resealed and the experiment repeated for an additional 4 hours.

At the end of the reaction period, the autoclave was cooled and the contents removed. Benzene was added in order to reduce the viscosity of the reaction products to ensure complete removal. Most of the benzene was then flashed off, but enough benzene was retained to enable the convenient filtration of the resulting mixture to separate the catalyst, calcium oxide and calcium sulfide from the hydrocarbons. The amount of sulfur in the filtrate was measured and compared to the sulfur content of the original residuum in order to determine the extent of desulfurization. Finally, the filtrate was mixed with pentane to determine how much of the filtrate was soluble therein. It is assumed that all of the product hydrocarbon except the asphaltenes and asphaltene-like materials would be soluble in pentane. The asphaltene content of the original 70% residuum was 24%.

Experiment II

Experiment I was repeated but this time 50 g. of calcium oxide alkaline reactant was added to the 100 g. of residuum and 4 g. of catalyst to insure the presence of sufficient calcium oxide to tie up all of the evolved $H_2S$. The autoclave was directly connected to a source of hydrogen gas and the hydrogen pressure was maintained at about 1300 p.s.i.g. during the reaction period. This experiment was conducted for a shorter period of time in that the temperature was slowly raised from 600° F. to 800° F. in a period of 1 hour; the 800° temperature was maintained for 1.1 hours and the temperature was then slowly decreased from 800° F. to 600° F. in the space of another hour. It has been determined that the desulfurization-cracking reaction does not occur to any appreciable extent until a temperature of about 650° F. is achieved. In other words, no consumption of hydrogen gas was noted below about 650° F.

The results of Experiments I and II are summarized in Table I below:

TABLE I

| Experiment | I-A | I-B | II |
|---|---|---|---|
| 70% residuum, g. | 100 | 100 | 100 |
| Catalyst, g. | 4 | 4 | 4 |
| CaO, g. | 35 | 35+10 | 50 |
| Temperature, ° F. | 800 | 800 | [1] 650–800 [2] 800 |
| Time, hours | 4 | 4 | [1] 1 [2] 1.1 |
| Percent desulfurization | 62 | 96 | 93.2 |
| Percent asphaltene in product | 9.0 | 5.0 | 5.0 |

[1] Conducted for 1 hour. [2] Conducted for 1.1 hour.

It is evident that the addition of the calcium oxide alkaline reactant significantly improves the percent desulfurization possible under the reaction conditions.

Another series of experiments was performed to determine the effect of the alkaline reactant and the solvent on the desulfurization of asphaltenes.

Experiment III

Ten grams of Cyrus asphaltene were dissolved in 90 g. of Tetralin. This was charged to an autoclave as in Experiment I, along with 2 g. of the cobalt-molybdena catalyst. After purging the autoclave with hydrogen gas, the autoclave was heated to a temperature of about 750° F. and the reaction was carried out for a period of about 48 hours at a hydrogen pressure of between 1100–1300 p.s.i.g. Upon completion of the reaction period, the contents were treated as in Experiment I above. In order to verify the results, a duplicate run was made.

Experiment IV

Experiment III was repeated but this time 20 g. of calcium oxide were added to the reactants and the reaction time was reduced to 24 hours. The reaction products were treated as in Experiment I. For the purposes of verification, a duplicate run was made.

Experiment V

Experiment IV was repeated, this time dissolving the Cyrus asphaltene in biphenyl rather than tetralin. Asphaltenes are soluble in biphenyl but biphenyl is not considered to be a hydrogen-donating material. Although the percent desulfurization was nearly the same as in Experiment IV, the reaction product contained considerably more asphaltene and asphaltene-like materials as determined from their pentane solubility.

The results of Experiments III–V are summarized in Table II.

TABLE II

| | Experiment | | | | |
|---|---|---|---|---|---|
| | III-A | III-B | IV-A | IV-B | V |
| Solvent | Tetralin | Tetralin | Tetralin | Tetralin | Biphenyl |
| Solvent, grams | 90 | 90 | 90 | 90 | 90 |
| Alkaline reactant, grams | None | None | CaO 20 | CaO 20 | CaO 20 |
| Time, hrs | 48 | 48 | 24 | 24 | 24 |
| Pentane soluble | 8.0 | 8.1 | 9.3 | 9.5 | 989 |
| Pentane insoluble | 2.0 | 1.9 | 0.7 | 0.5 | 1.19 |
| Percent desulfurization | 80 | 81 | 96 | 97 | 96 |

When the results of Experiments III-A and III-B are compared to those of Experiments IV-A and IV-B it is observed that the combination of the hyrdogen donor and alkaline reactant greatly reduces the sulfur content and insoluble asphaltene content of the product. Further, as indicated in Example V, solvents which are not hydrogen donor compounds do not accomplish the reduction in insoluble asphaltenes achieved by the hydrogen donor compounds. These experiments demonstrate the advantageous reduction of asphaltenes and sulfur when a system employing an alkaline reactant and a hydrogen donor is used. In order to better isolate the effects of the process of this invention, 100% asphaltene material was dissolved and desulfurized in the foregoing experiments. It will be appreciated, however, that the same effects will be realized where a hydrogen donor and an alkaline residuum-containing reactant are contacted with a heavy liquid hydrocarbon containing these asphaltenes. In such a process the hydrogen donor would effect solvolysis by preventing the usual precipitation of asphaltenes during the desulfurization.

Although the experiments presented herein were performed in a batch reactor, the described composite hydrogenolysis-alkaline reactant process could easily be applied to fixed bed systems, ebullating bed systems, fluid bed systems, or suspension flow systems. In any case, it is important to make provision for the regeneration of the consumed alkaline reactant. This regeneration includes the removing of the combined sulfur and the converting of the sulfides back to the metal oxide or metal hydroxide form. There must always be sufficient alkaline reactant present in the system to react with the $H_2S$ gas evolved.

What I claim is:

1. A process for desulfurizing residuum-containing hydrocarbons, said hydrocarbons including molecules having combined sulfur, comprising:
    (a) passing hydrogen gas into a reaction zone to contact said hydrocarbons within said reaction zone with said hydrogen gas and a hydrogen transfer catalyst at a temperature and hydrogen partial pressure sufficient to permit at least some of the combined sulfur to be released from the hydrocarbon molecules as $H_2S$; and
    (b) removing $H_2S$ from the reaction zone by reacting it within the reaction zone with an alkaline composition to form a solid alkaline sulfide product.

2. The process of claim 1 wherein the metal of the alkaline composition is selected from the group consisting of the alkali metals and the alkaline earth metals and the anion of the alkaline composition is selected from the group consisting of the oxides, hydroxides, sulfides and carbonates.

3. The process of claim 2 wherein the sulfide product is removed from the reaction zone, the alkaline composition is regenerated from the sulfide product, and the regenerated alkaline composition recycled to the reaction zone.

4. The process of claim 3 wherein the alkaline composition is calcium oxide.

5. The process of claim 3 wherein the alkaline composition is dolomite.

6. The process of claim 3 wherein the hydrogen transfer catalyst comprises a metallic component selected from the group consisting of the elements, oxides and sulfides of the transition metals.

7. The process of claim 6 wherein the transition metal is selected from the group consisting of the Group II-B, VI-B, VII-B, and VIII metals of the Periodic Table of the Elements.

8. The process of claim 7 wherein the transition metal is selected from the group consisting of iron, cobalt, nickel, molybdenum, tungsten, chromium, palladium, platinum, zinc and copper.

9. The process of claim 6 wherein the hydrogen transfer catalyst additionally comprises a carrier.

10. The process of claim 9 wherein the carrier is selected from the group consisting of alumina, titania, vanadia, silica, thoria, zirconia, asbestos, kieselguhr, bauxite, clay and mixtures thereof.

11. The process of claim 9 wherein the hydrogen transfer catalyst comprises the oxides of cobalt and molybdenum and the carrier is alumina.

12. The process of claim 1 wherein said hydrocarbons are additionally contacted with a hydrogen donor within said reaction zone.

13. The process of claim 9 wherein said hydrocarbons are additionally contacted with a hydrogen donor within said reaction zone.

14. The process of claim 13 wherein said hydrogen donor is selected from the group consisting of Tetralin and Decalin.

15. A process for desulfurizing heavy asphaltic hydrocarbons, said hydrocarbons being essentially solid at ordinary temperatures and including molecules having combined sulfur, comprising:
    (a) dissolving said hydrocarbons in a solvent;
    (b) passing hydrogen gas into a reaction zone to contact said dissolved hydrocarbons with said hydrogen gas and a hydrogen transfer catalyst, said catalyst comprising a metallic component selected from the elements, oxides and sulfides of the transition metals on a carrier, at a temperature and hydrogen pressure sufficient to permit at least some of the combined sulfur to be released from said dissolved hydrocarbons as $H_2S$;
    (c) removing $H_2S$ from the reaction zone by reacting it with an alkaline composition within the reaction zone to form a solid alkaline sulfide product;
    (d) withdrawing the sulfide product from the reaction zone and treating it to regenerate the alkaline composition; and
    (e) recycling the regenerated alkaline composition into the reaction zone.

16. The process of claim 15 wherein the solvent also functions as a hydrogen donor.

17. The process of claim 16 wherein the hydrogen donor is selected from the group consisting of Tetralin and Decalin.

References Cited

UNITED STATES PATENTS

| | | | |
|---|---|---|---|
| 2,856,347 | 10/1958 | Seelig et al. | 208—212 |
| 2,959,538 | 11/1960 | Weikart et al. | 208—212 |
| 3,128,155 | 4/1964 | Mattox | 208—212 |
| 3,551,124 | 12/1970 | Iwaki et al. | 208—212 |

DELBERT E. GANTZ, Primary Examiner

G. J. CRASANAKIS, Assistant Examiner

U.S. Cl. X.R.

208—213, 216, 228